Patented Feb. 28, 1950

2,498,630

UNITED STATES PATENT OFFICE 2,498,630

STABILIZATION OF ORGANIC COMPOUNDS

Ralph B. Thompson, Riverside, Ill., assignor to Universal Oil Products Company, Chicago, Ill., a corporation of Delaware No Drawing. Application October 27, 1945, Serial No. 625,100

2 Claims. (Cl. 44—74)

This invention relates to a method of stabilizing organic compounds which tend to deteriorate in storage or in use due to undesirable oxidation reactions.

Various organic compounds, including motor fuels, mineral oils, lubricating oils, drying oils, rubber, etc., are adversely affected by oxygen, with the resultant formation of undesirable gums, and usually discoloration of the organic compound, as well as other deleterious reactions. This is particularly true of motor fuels comprising olefinic gasolines, such as cracked gasoline and polymer gasoline.

One object of the present invention is to prevent or at least substantially retard this undesirable deterioration of organic compounds.

Another object of the invention is to provide a novel inhibitor which will function to stabilize organic compounds.

Various inhibitors have heretofore been proposed and one of the more successful of these inhibitors is a N, N'-substituted paraphenylene diamine. While this inhibitor is highly satisfactory for the purpose, it does have one disadvantage in that it tends to crystallize at low temperatures.

We have now discovered that N, N'-substituted paraphenylene diamines by modification in accordance with the teachings of the present invention avoid the disadvantages of crystallization at low temperature and further that the modified inhibitors of the present invention will actually have a higher potency than the heretobefore proposed inhibitor.

In one embodiment the present invention relates to a method of stabilizing an organic compound against deterioration by oxygen which comprises incorporating therein an inhibitor comprising the product formed by the reductive alkylation of an aromatic amino compound selected from the group consisting of paraphenylene diamine and paranitroaniline and at least two different carbonyl compounds selected from the group consisting of aldehydes and ketones.

In another embodiment the present invention relates to a method of stabilizing motor fuels which tend to deteriorate due to oxygen by incorporating therein an inhibitor comprising the product formed by the reductive alkylation of an aromatic amino compound selected from the group consisting of paraphenylene diamine and paranitroaniline with methyl-ethyl-ketone and acetone.

In another embodiment the present invention relates to a method of stabilizing an organic compound against deterioration by oxygen which comprises incorporation therein of an inhibitor comprising (1) a N,N'-hydrocarbon substituted para-phenylene diamine in which the substituent groups are different, (2) a N,N'-hydrocarbon substituted paraphenylene diamine in which the substituent groups are the same, and (3) a N,N'-hydrocarbon substituted paraphenylene diamine in which the substituent groups are the same but are different from the substituent groups of (2).

In another embodiment the present invention relates to a method of stabilizing motor fuel and particularly cracked gasoline against deterioration by oxygen which comprises incorporating therein an inhibitor comprising a mixture of the three components hereinbefore set forth.

Still another embodiment of the present invention comprises an organic compound which tends to undergo deterioration by oxygen containing, as an inhibitor for said deterioration, an inhibitor comprising the product formed by the reductive alkylation of an aromatic amino compound selected from the group consisting of paraphenylene diamine and paranitroaniline and at least two different carbonyl compounds selected from the group consisting of aldehydes and ketones.

Still another embodiment of the present invention relates to motor fuel and particularly cracked gasoline which tends to undergo deterioration by oxygen, containing, as an inhibitor for said deterioration, an inhibitor comprising a mixture of the three components hereinbefore set forth.

In still another specific embodiment the present invention relates to a novel composition of matter comprising the product formed by the reductive alkylation of an aromatic amino compound selected from the group consisting of paraphenylene diamine and paranitroaniline and at least two different carbonyl compounds selected from the group consisting of aldehydes and ketones.

Still further embodiment of the invention contemplates a novel composition of matter comprising a mixture of the three components hereinbefore set forth.

The improved inhibitor of the present invention may be manufactured in any suitable manner. One particularly suitable method is to react paraphenylene diamine with a mixture of two different ketones. A specific example of an improved inhibitor is the product formed by reacting paraphenylene diamine with a mixture of methyl-ethyl-ketone and acetone in the presence of a suitable catalyst and hydrogen. In this particular instance, acetone is more reactive than methyl-ethyl-ketone, and a smaller molecular proportion of acetone as compared to methyl-ethyl-ketone should be utilized in order to avoid the formation of an excessive amount of N,N'-di-isopropylparaphenylene diamine. This same general principle applies to other carbonyl compounds; namely, a smaller molecular proportion of the more reactive ketone should be utilized so that the desired mixed alkyl substituted compounds are formed.

In place of acetone and methyl-ethyl-ketone as used in the above example, these ketones, alone or together, may be used in admixture with other ketones, such as dimethyl, diethyl, methyl propyl, ethyl propyl, dipropyl, methyl butyl, ethyl butyl, propyl butyl, di-butyl, etc.

In place of paraphenylene diamine, para-nitroaniline may be employed since in the reductive alkylation reactions the para-nitroaniline is reduced to para-phenylene diamine and then undergoes the desired reductive alkylation. Similarly, in place of the ketones, a suitable aldehyde, as, for example, acetaldehyde, propionaldehyde, butyraldehyde, valeraldehyde, etc., may be employed. However, when utilizing an aldehyde, lower temperatures and lower hydrogen pressures are normally employed in order to control the reaction to form the desired substituted compounds.

A suitable catalyst for effecting the desired reaction comprises a mixture of the oxides of chromium, copper, and barium, although other suitable catalysts may be employed. In general, the reaction is effected at an elevated temperature of about 100 to about 250° C. under a hydrogen pressure of about 10 to about 200 atmospheres.

In general it is preferred that, in the reductive alkylation product, at least one of the substituent groups attached to the nitrogen atoms of the paraphenylene diamine, contains at least three carbon atoms so that a branched structure arrangement is obtained. While secondary alkyl substituent groups are preferred for at least one of the alkyl groups containing four or more carbon atoms, it is understood that the iso and tertiary-alkyl groups may be used but not necessarily with equivalent results. It is also preferred that, when one of the substituent groups contain four or more of the carbon atoms, the other substituent groups should contain three or less carbon atoms, in order not to decrease the potency of the inhibitor to below that desired.

A particularly preferred inhibitor of the present invention comprises (1) N-sec-butyl-N'-isopropyl-paraphenylene diamine, (2) N,N'-di-isopropyl-paraphenylene diamine, and (3) N,N'-di-sec-butyl-paraphenylene diamine. However, since the broad concept of the present invention also contemplates substituted phenylene diamines containing other hydrocarbon substituent groups, it is apparent that a large number of improved inhibitors may be prepared and utilized in accordance with the present invention, the primary limitation being that different hydrocarbon substituent groups are present in the inhibitor composition.

In general, the alkyl substituent groups will contain not more than six carbon atoms per radical, although it is understood that in some cases higher alkyl radicals may be employed. Typical representative examples of suitable components of the inhibitor of the present invention include N-alkyl-N'-alkyl paraphenylene diamines in which the substituent groups are selected from the group comprising methyl, ethyl, normal propyl, isopropyl, normal butyl, isobutyl, sec-butyl, terbutyl, normal amyl, iso-amyl, sec-amyl, ter-amyl, normal hexyl, sec-hexyl, etc. It is understood that the various inhibitors which may be utilized in the present invention are not necessarily equivalent in their potency, but in each case the inhibitor comprising a mixture of hydrocarbon radicals, whether attached to the same or different paraphenylene diamine, will avoid the disadvantages of crystallization at low temperatures inherent in substituted paraphenylene diamine inhibitors, in which the substituent groups are similar.

Another embodiment of the invention comprises a mixture of (1) a N,N'-di-alkyl-paraphenylene diamine in which the alkyl groups are the same, and (2) a N,N'-di-alkyl-paraphenylene diamine in which the alkyl groups are the same but are different from the alkyl groups of (1). A particularly preferred inhibitor within this embodiment of the invention comprises a mixture of N,N'-di-isopropyl-para-phenylene diamine and N,N'-di-sec-butyl-paraphenylene diamine. It is understood, however, that the other alkyl groups, as hereinbefore set forth, may be utilized but not necessarily with equivalent results.

The inhibitor of the present invention will usually be added to gasoline in an amount less than 0.1% by weight and generally will be utilized in an amount from about 0.0001% to about 0.01%. The exact amount required will depend upon the particular organic compounds being treated and upon the potency of the specific inhibitor selected. These inhibitors may also be employed in connection with various dyes, antiknock agents, such as tetraethyl lead, metal deactivators, or other additives employed for specific purposes in the organic compounds.

Still another embodiment of the present invention contemplates the inhibitor hereinbefore set forth in admixture with a minor amount of an amine. The amine may be an alkyl, cycloalkyl, or aroalkyl amine and thus may comprise n-butyl amine, 2-ethyl hexyl amine, 2-amino heptane, decycloamine, cyclohexyl amine, benzylamine, etc. Amines which are relatively insoluble in water are preferred. The amines serve to further lower the crystallization temperature of the inhibitor and also to decrease the tendency of the inhibitor itself and the organic compounds containing the inhibitor to become colored when exposed to air. For example, when the inhibitor is used in gasoline, the addition of the amine to the inhibitor may cause less deposition of inhibitor or oxidation products in engines. Further, when the inhibitor is used in the presence of tetraethyl lead fluid, there is no development of color on exposure to light. The amine is added to the inhibitor in quantities within the range of about one to about 15% by weight of the inhibitor mixture.

The following examples are introduced to illustrate further the novelty and utility of the present invention but not with the intention of unduly limiting the same.

*Example I*

Twenty-seven g. of p-phenylene diamine (0.25 mol.) 15 g. of actone (0.25 mol.), and 126 g. of methyl-ethyl-ketone (1.75 mol.), were hydrogenated at 160° C. and 60–90 atmospheres pressure in the presence of 4 g. of catalyst consisting of $10Cr_2O_3:10CuO:1BaO$. When hydrogen absorption ceased, the product was filtered and the mixture of alcohols, ketones and water removed in vacuo.

The residue, distilled at 1 mm. boiled at 118–130° C. and weighed 43.7 g. It could not be induced to crystallize even at —78° C.

In contrast, N,N'-di-sec-butyl-para-phenylene diamine will crystallize at a temperature of 18–19° C., while N,N'-di-isopropyl-para-phenylene diamine will crystallize at a temperature of 50–51° C.

*Example II*

In addition to the advantages of non-crystallization at low temperatures, the mixed inhibitor of Example I is of higher potency than N,N'-di-sec-butyl-para-phenylene diamine. Pennsylvania cracked gasoline was utilized as the sample to be tested. 0.006% of the inhibitor of Example I was added to a portion of the sample gasoline. 0.006% of N,N'-di-sec-butyl-para-phenylene diamine was added to another portion of the sample gasoline. The di-sec-butyl-compound gave an induction period of 460 minutes, while the inhibitor of Example I gave an induction period of 540 minutes.

*Example II*

N-sec-butyl-N'-isopropyl - paraphenylene diamine, will crystallize at a temperature of 35–36° C., whereas the improved inhibitor of the present invention, as represented by Example I, did not crystallize at temperatures as low as —78° C. It is thus seen that the present invention contemplates more than just the presence of two different substituent groups but that the different substituent groups must be attached to at least two different ring structures.

The advantages of the present invention also carry over into the improved potency of the inhibitors. When utilized for the stabilization of Pennsylvania cracked gasoline in the same manner as set forth in Example II, N-sec-butyl-N'-isopropyl-paraphenylene diamine gave an induction period of 506 minutes whereas it will be noted from Example II the inhibitor of Example I gave an induction period of 540 minutes.

I claim as my invention:

1. Gasoline containing a minor amount of an oxidation inhibitor prepared by the reductive alkylation of p-phenylene diamine with a mixture of methyl-ethyl-ketone and acetone in which the acetone is in smaller molecular proportion than the methyl-ethyl-ketone.

2. Gasoline containing a minor amount of an oxidation inhibitor prepared by the reductive alkylation of p-phenylene diamine with a mixture of ketones of different reactivity in which the more reactive ketone is in smaller molecular proportion than the less reactive ketone.

RALPH B. THOMPSON.

REFERENCES CITED

The following references are of record in the file of this patent:

UNITED STATES PATENTS

| Number | Name | Date |
| --- | --- | --- |
| 1,992,014 | Rogers | Feb. 19, 1935 |
| 2,054,276 | Wilson | Sept. 15, 1936 |
| 2,395,382 | Walters | Feb. 19, 1946 |